US012422779B2

(12) United States Patent
Newman et al.

(10) Patent No.: US 12,422,779 B2
(45) Date of Patent: Sep. 23, 2025

(54) OPTICAL ASSEMBLY AND METHOD FOR REDUCING ZERO-ORDER LIGHT IN A HOLOGRAPHIC DISPLAY

(71) Applicant: VividQ Limited, London (GB)

(72) Inventors: Alfred James Newman, London (GB); Andrzej Kaczorowski, London (GB)

(73) Assignee: VividQ Limited, London (GB)

( * ) Notice: Subject to any disclaimer, the term of this patent is extended or adjusted under 35 U.S.C. 154(b) by 614 days.

(21) Appl. No.: 17/850,740

(22) Filed: Jun. 27, 2022

(65) Prior Publication Data

US 2022/0326655 A1 Oct. 13, 2022

Related U.S. Application Data

(63) Continuation of application No. PCT/EP2021/051566, filed on Jan. 25, 2021.

(30) Foreign Application Priority Data

Jan. 30, 2020 (GB) ...................................... 2001289

(51) Int. Cl.
*G03H 1/22* (2006.01)
*G02B 27/01* (2006.01)

(52) U.S. Cl.
CPC ....... *G03H 1/2205* (2013.01); *G02B 27/0172* (2013.01); *G02B 2027/0145* (2013.01);
(Continued)

(58) Field of Classification Search
CPC ............... G03H 1/2205; G03H 1/2286; G03H 2001/2231; G03H 2222/13;
(Continued)

(56) References Cited

U.S. PATENT DOCUMENTS 3,233,040 A 2/1966 Crane
9,013,793 B2 4/2015 Gupta et al.
(Continued)

FOREIGN PATENT DOCUMENTS

CN 109031669 A * 12/2018 ......... G02B 27/0172
CN 109085700 A 12/2018
(Continued)

OTHER PUBLICATIONS

Verrier et al.; "Off-axis digital hologram reconstruction: some practical considerations"; Applied Optics vol. 50, Issue 34, pp. H136-H146 (2011), Nov. 17, 2011.
(Continued)

*Primary Examiner* — Jia X Pan
(74) *Attorney, Agent, or Firm* — EIP US LLP

(57) ABSTRACT

An optical assembly is provided for use in holographic display of a replay image. The optical assembly may be of particular use is an augmented reality headset. The optical assembly includes a light-modulation element arranged to be illuminated off-axis by a light beam. The light-modulation element modulates the incident light to generate a replay image and generates a zero-order light beam. A focusing system is arranged after the light-modulation element. A light remover is positioned after the focussing system and is configured to remove the zero-order light beam from the light focussed by the focussing system. The focussing system is configured to focus zero-order light from the light-modulation element in a first plane different from a second plane which is the plane of focus of parallel light of the replay image. The light remover removes the zero-order light in the first plane.

20 Claims, 4 Drawing Sheets

(52) U.S. Cl.
CPC ............... *G02B 2027/0174* (2013.01); *G02B 2027/0178* (2013.01); *G03H 2001/2231* (2013.01); *G03H 1/2286* (2013.01); *G03H 2222/13* (2013.01); *G03H 2223/12* (2013.01); *G03H 2223/22* (2013.01); *G03H 2225/32* (2013.01); *G03H 2225/52* (2013.01); *G03H 2227/03* (2013.01)

(58) Field of Classification Search
CPC .......... G03H 2223/12; G03H 2223/22; G03H 2225/32; G03H 2225/52; G03H 2227/03; G02B 27/0172; G02B 2027/0145; G02B 2027/0174; G02B 2027/0178
See application file for complete search history.

(56) References Cited

U.S. PATENT DOCUMENTS

| | | | |
|---|---|---|---|
| 9,494,800 | B2 | 11/2016 | Border et al. |
| 2001/0013972 | A1 | 8/2001 | Doany et al. |
| 2001/0026398 | A1 | 10/2001 | Doany et al. |
| 2005/0018259 | A1 | 1/2005 | Holmes et al. |
| 2006/0227069 | A1 | 10/2006 | Baselmans et al. |
| 2009/0128872 | A1 | 5/2009 | Christmas et al. |
| 2016/0274384 | A1 | 9/2016 | Takiguchi |
| 2017/0123204 | A1* | 5/2017 | Sung .................... G03H 1/2294 |
| 2019/0004478 | A1 | 1/2019 | Gelman et al. |
| 2019/0015033 | A1 | 1/2019 | Sahin |
| 2019/0056693 | A1 | 2/2019 | Gelman et al. |
| 2022/0326656 | A1* | 10/2022 | Newman ............ G02B 27/0172 |

FOREIGN PATENT DOCUMENTS

| | | |
|---|---|---|
| CN | 109085700 A1 | 12/2018 |
| CN | 110609392 A | 12/2019 |
| EP | 2508951 A1 | 10/2012 |
| EP | 2880496 B1 | 9/2019 |
| JP | 11295638 A | 10/1999 |
| JP | 2001117142 A | 4/2001 |
| JP | 2008145614 A | 6/2008 |
| JP | 2008216578 A | 9/2008 |
| JP | 2008275909 A | 11/2008 |
| JP | 2008300106 A | 12/2008 |
| JP | 2009536747 A | 10/2009 |
| JP | 3187510 U | 12/2013 |
| JP | 2017167346 A | 9/2017 |
| JP | 2018518695 A | 7/2018 |
| JP | 2018205754 A | 12/2018 |
| WO | 2018169974 A1 | 9/2018 |
| WO | 2018211494 A1 | 11/2018 |

OTHER PUBLICATIONS

RealView Imaging—Holographic Augmented Reality Company Presentation, Jun. 2018.
International Search Report and Written Opinion dated Apr. 15, 2021 for PCT Application No. PCT/EP2021/051566.
International Preliminary Report on Patentability dated Jan. 7, 2022 for PCT Application No. PCT/EP2021/051566.
Notice of Allowance dated Aug. 1, 2023 for Japanese Patent Application No. 2022-545933.

* cited by examiner

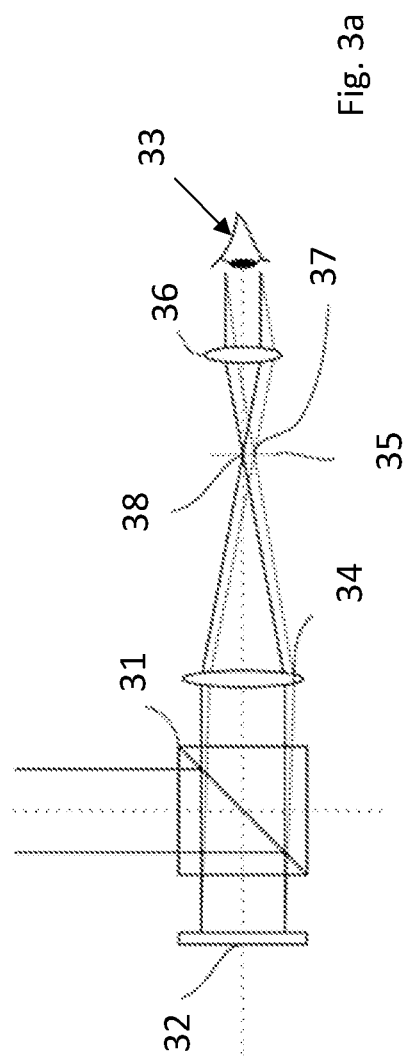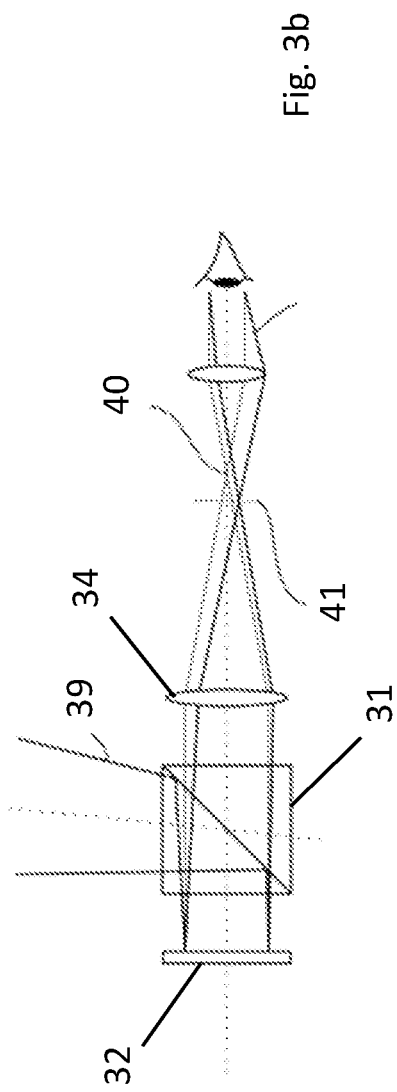

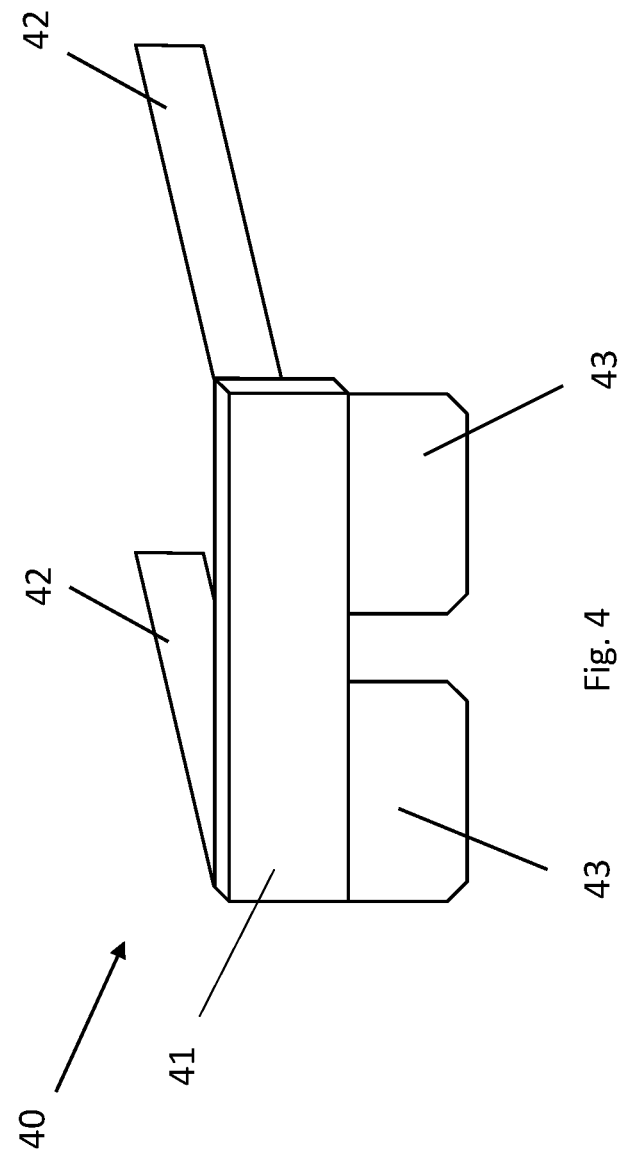

OPTICAL ASSEMBLY AND METHOD FOR REDUCING ZERO-ORDER LIGHT IN A HOLOGRAPHIC DISPLAY

CROSS-REFERENCE TO RELATED APPLICATIONS

This application is a continuation of International Application No. PCT/EP2021/051566, filed Jan. 25, 2021 which claims priority to GB Application No. GB 2001289.4, filed Jan. 30, 2020, under 35 U.S.C. § 119(a). Each of the above-referenced patent applications is incorporated by reference in its entirety.

BACKGROUND

Technical Field

The present invention relates to an optical assembly for use in holographic display of a replay image and a method for generating a holographic replay image. More particularly, the optical assembly is for use in a near-eye display such as a holographic augmented-reality (AR) headset or a virtual reality (VR) headset. In such AR and VR headsets, the optical assembly may be used for generating a holographic replay image that is subsequently delivered to a user wearing the headset. Other applications are also considered, such as use in a heads up display (HUD) or a projector.

Background

Augmented reality (AR) headsets in which a user wears a headset having an appearance similar to glasses are known. In some AR headsets, a 2D image is projected onto a screen element in front of a user's eyes so that the user can see both their surroundings and the image that is projected onto the screen element. The term 'mixed reality' is sometimes also used to describe virtual images (images projected onto a screen element) interacting with real objects. For the purposes this application, the term 'augmented reality' is understood broadly to include the term 'mixed-reality'. Virtual reality (VR) headsets are also known, in which a user wears a headset that covers their eyes so that the user sees an image projected onto a screen element but not their surroundings.

AR and VR headsets have a wide range of potential uses from gaming to commercial applications, such as design prototyping.

Holographic displays are also known which manipulate light to create a three-dimensional image of an object. The use of spatial light modulators in such displays to control the phase of light to reproduce a 3-dimensional image has also been considered.

A problem that occurs when using spatial light modulators for holographic imaging is that, in addition to the holographic replay image, the spatial light modulator generates a zero-order light beam caused by light falling on non-addressable areas or dead space between pixels of the spatial light modulator or due to errors in the displayed phase (such as where an actual phase value produced by the spatial light modulator does not exactly match a requested phase value). The zero-order light beam is an unwanted feature that can be difficult to remove from the replay image.

SUMMARY

According to a first aspect of the present invention, there is provided an optical assembly for use in holographic display of a replay image comprising:

a light source;
a light-modulation element arranged to be illuminated off-axis by a light beam and configured to modulate the incident light, the light-modulation element comprising an array of pixels and being arranged to generate a replay image and a zero-order light beam;
a focusing system arranged after the light-modulation element and configured to focus modulated light from the light-modulation element and the zero-order light beam;
a light remover positioned after the focusing system configured to remove the zero-order light beam from the light focused by the focusing system; and
a terminal optical element for directing modulated light, from which the zero-order light has been removed by the light remover, from the optical assembly;
wherein the focusing system is configured to focus the zero-order light from the light-modulation element in a first plane different from a second plane which is a plane of focus of parallel light of the replay image, and
wherein the light remover is configured to remove the zero-order light in the first plane.

An advantage of the present invention is that the zero-order light is removed preventing a bright light being passed on to the viewer. A further advantage is that the zero-order light is removed in a plane different from a plane of focus of parallel light of the replay image. In this way, a harsh edge caused by removal of the zero-order light can be avoided. Illumination "off-axis" refers to illumination at an angle to the optical axis of the component, rather than illumination parallel to or coaxial with the optical axis.

A further advantage is that the effects of a "conjugate image" can be reduced. A conjugate image results from imperfect phase control of the spatial light modulator and is a visible additional image that resembles a flipped and rotated version of the desired image. Such a conjugate image focuses in the opposite sense to the replay image, that is moving the replay object closer moves the conjugate object further away. An advantage of the different first and second planes of focus is that this also has the effect of making any conjugate image impossible to focus on, reducing its impact.

In some embodiments, the focusing system is configured to form an intermediate replay image beyond the light remover located in the first plane. As the zero-order light is removed before the replay image, any zero-order light remaining may be converging when a user views it; it is converging when it reaches the user's pupil so that it focuses before it reaches the user's retina and is diverging at the point it is incident on the retina. As a consequence, the user is unable to focus on the zero-order light which is advantageous from a laser safely perspective.

The optical assembly may further comprise a collimator illuminated by a light beam from the light source to cause the light beam to be collimated such that the light beam converges. The converging light beam brings forward the plane of focus of the zero-order light from the light-modulation element allowing the zero-order light to be removed at the light remover.

The optical assembly may further comprise a polarising beam splitter configured to receive light from the collimator and reflect the received light onto the light-modulation element, wherein the axis of the collimator is out of alignment with an optical axis of the polarising beam splitter such that a centre of the beam of light from the collimator hits the light-modulation element off-centre. In some embodiments, the optical axis of the collimator is arranged at an angle with respect to the optical axis of the polarising beam splitter, which angle is substantially equal to the value of the shortest wavelength of light in the light beam divided by twice the value of a pixel pitch of the array of pixels. By arranging the collimator and polarising beam splitter to illuminate the light-modulation element off-axis, the zero-order light beam from the light modulation element is off-axis and can be removed by the light remover.

A polariser may be arranged between the polarising beam splitter and the light-modulation element. In some embodiments, the polariser is tilted with respect to the optical axis of the light-modulation element so that any direct reflections are not a direct reflection of the zero-order light. Avoiding direct reflection of the zero-order light may improve image quality by avoiding artefacts caused by that reflection.

The polariser may be arranged to permit transmission of light having a polarisation set at 45 degrees to the polarisation plane of the polarising beam splitter. In such embodiments, the light from the polarising beam splitter may be reduced in intensity by around half by the polariser. Light reflected from the light modulator may be reduced by around half again when it passes through the polarising beam splitter. A consequence of this arrangement is that a viewer of a replay image from the optical assembly is isolated from any specular reflections from the polarising beam splitter and/or the polariser.

In some embodiments, all optical elements located after the light-modulation element, including the focusing system, are centred on a centre of the field of view of the replay image. The reason for this is that field-variant aberrations after the light-modulation element cannot be fully corrected. Accordingly, any manipulation of the light off-axis occurs before the light-modulation element.

The optical assembly may comprise a mirror positioned after the light modulation element, wherein the mirror is located within a recess or aperture to inhibit reflection of peripheral light. This tends to improve off-axis performance of the optical assembly. Alternatively, or additionally, the mirror may be surrounded by a light absorbing material to inhibit reflection of peripheral light.

The light remover may be a field-stop aperture. The arrangement of components means that the zero-order light is directed off-axis, i.e. displaced from the centre line, so a field-stop aperture can allow the replay image to pass through the aperture and stop the zero-order light which is outside the aperture. In such embodiments, the light-modulation element may comprise an adjuster to allow the light-modulation element to be tilted about at least one axis thereby allowing the zero-order light to be directed onto the field-stop aperture. This is particularly convenient if not working with high manufacturing tolerances as it allows the optical assembly to be adjusted. Additionally, the optical assembly may be provided with a sensor to detect whether or not zero-order light is being cut out by the field-stop aperture. If a sensor is provided, the optical assembly may be configured to stop light emission by the light source in a case that light is being emitted by the light source and light is not detected by the sensor. The sensor is a safety feature that positively accounts for the zero-order light and ensures that it is not transferred to an end-user.

The focusing system may be an objective lens.

The optical assembly may comprise a Plossl optical component located after the field-stop aperture wherein the Plossl optical component comprises a pair of symmetric optical elements and is configured to generate a reduced image to be output from the optical assembly. The Plossl optical component typically allows good image quality with a relatively small number of components. In addition, the short focal length tends to make the optical assembly more compact.

A second aperture may be provided after the Plossl optical component to remove stray light. This tends to improve off-axis performance of the optical assembly.

According to another aspect of the invention, there is provided a holographic display comprising an optical assembly as discussed above, with or without the optional features also described. Such a display may have a compact form. The light-modulation element may be configured to modulate the phase of an incoming light beam in order to generate a replay image. The display may comprise a combiner to combine an image from the optical assembly with light from another light source, which enables augmented reality applications, for example.

In some examples, the display is a near-eye display. The term "near-eye display" is used in the art to encompass applications where a display is positioned close to an eye in use, such as in VR and AR applications. For example, a near-eye display may be within 10 mm, within 20 mm, within 30 mm, within 40 mm, within 50 mm, within 100 mm or within 200 mm of the eye. In one example, the holographic display is a binocular holographic near-eye display, comprising a first optical assembly and a second optical assembly. Each of the optical assemblies may be positioned so that they generate a respective replay image in field of vies of a respective one of the eyes of a user. The near-eye display may be a self-contained headset. A self-contained headset is one where the components of the optical engine are supported by a user's head rather than an external structure and is enabled by the compact construction of the optical system. A self-contained headset can be provided with a cable connection for power and/or data or have no cable connections, for example using wireless communication protocols and comprising a power source within the headset.

According to another aspect of the invention there is provided a heads up display comprising an optical assembly as discussed above. According to yet another aspect of the invention there is provided a projector comprising an optical assembly as discussed above.

According to a further aspect of the present invention there is provided a method for generating a holographic replay image, the method comprising:
  illuminating a light modulation element with a converging light beam such that light from the light beam illuminates the light modulation element off-axis to generate a replay image and a zero-order light beam;
  focusing the light from the light modulation element so that the zero-order light beam is focused in a first plane different from a second plane which is the plane of focus of parallel light of the replay image; and
  removing the zero-order light in the first plane.

Such a method can avoid hard transitions in the replay image due to the removal of the zero-order light and/or improve safety.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 3a and 3b illustrate a difference between using an on-axis parallel light beam to illuminate a spatial light modulator and using an off-axis converging light beam; and FIG. 4 shows a holographic augmented-reality headset.

DETAILED DESCRIPTION

Figure 1:
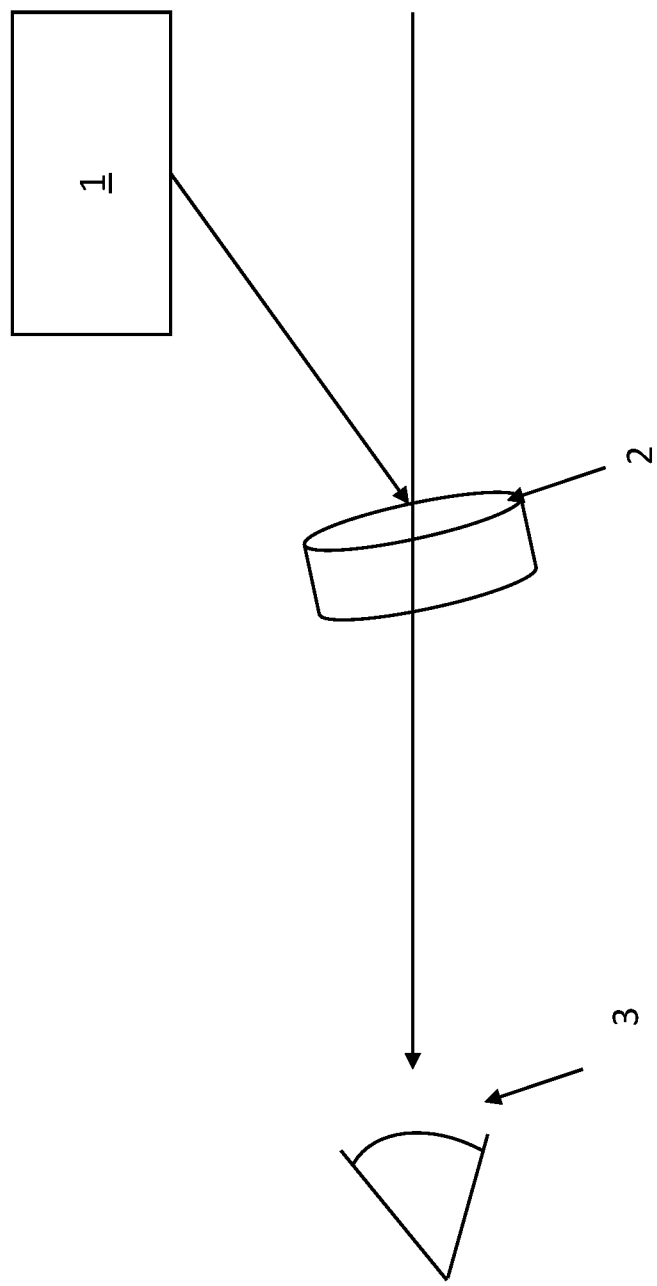
FIG. 1 shows components of a holographic augmented-reality headset.

FIG. 1 shows, in general terms, components of a holographic augmented-reality headset comprising an optical assembly in the form of an optical engine 1 and an optical combiner 2 for combining light from the optical engine 1 with light from a user's surroundings and displaying it to a user. By combining the light from the surroundings with the image generated by the optical engine 1 an augmented reality effect can be created for a user. The optical combiner 2 generally comprises one or more optical elements to guide light from the optical engine 1 and a display element that combines the holographic image with light from a user's surroundings to deliver the combined light to the user for viewing. The optical combiner 2 guides light from the optical engine 1 to a user's eye 3.

Figure 2:
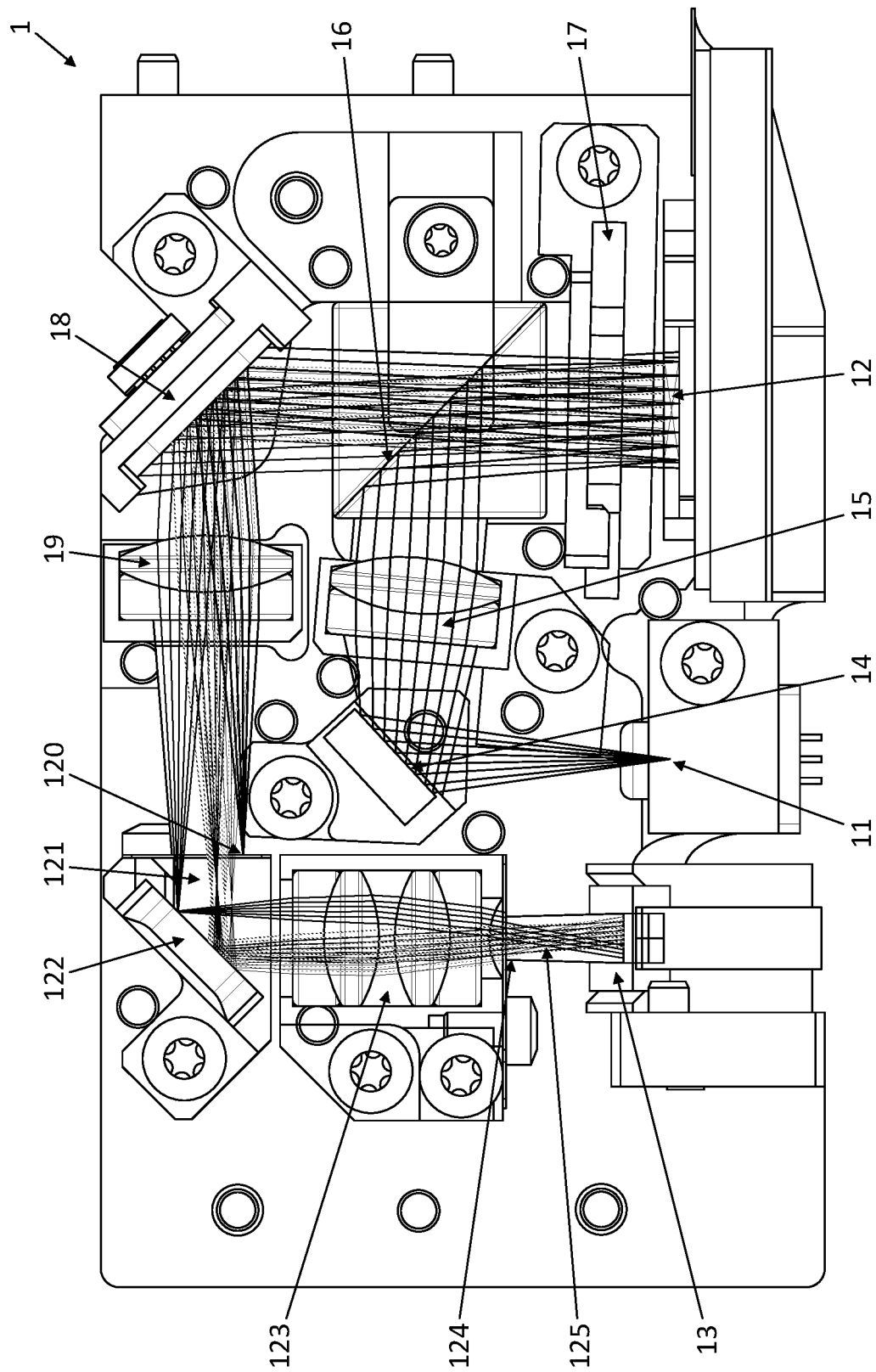
FIG. 2 is a diagram showing components within an optical engine shown in FIG. 1.

FIG. 2 shows greater detail of the optical engine 1 in a plan view. The optical engine 1 includes a light source in the form of an RGB laser diode 11 (hereinafter 'laser diode') which is configured to illuminate a light modulation element in the form of a spatial light modulator 12. The laser diode 11 is a Sumitomo Electric® SLM-RGB-T20-F-2 laser diode, but other laser diodes may be used. The laser diode 11 outputs diverging laser light. The light is emitted with a vertical polarisation (vertical direction being out of the page when viewing FIG. 2) and with greater divergence in the horizontal plane (in the plane of the page). The laser diode 11 is referred to as an RGB diode because it rapidly switches between emitting different colours of laser light, periodically emitting red, green, and blue light. By modulating the laser light in different times when the different colours are emitted the appearance of a colour holographic image may be created for a user.

The spatial light modulator 12 is a Compound Photonics® DP1080p26 micro-display and is configured to adjust the phase of light. By controlling the phase of light, it is possible to use interference to create a holographic replay image (hereinafter 'replay image'). The spatial light modulator 12 comprises an array of pixels. Each pixel includes a variable liquid crystal retarder in front of a mirrored back-plane that can be controlled to adjust the phase of the reflected light. The present invention is not tied to a particular spatial light modulator technology or component and it is expected that this technology will change over time, for example increasing resolution and refresh rate. The replay image is output from the optical engine 1 at a terminal optical element in the form of an output fold mirror 13, more specifically a metallic plano mirror. Referring to FIG. 1, the light from the output fold mirror 13 is sent to the optical elements of the optical combiner 2 for delivery to the user.

Optical elements are provided to guide the light from the laser diode 11 to the spatial light modulator 12. A reflector in the form of a first fold mirror 14 is provided opposite the laser diode 11 which serves to reflect light from the laser diode 11. As with the output fold mirror 13, the first fold mirror 14 is a metallic plano mirror.

The light from the first fold mirror 14 is directed towards a collimator in the form of a laser collimating lens 15, which is a component that narrows a diverging beam of light. In the first embodiment, the laser collimating lens 15 narrows the light from the first fold mirror 14 such that upon leaving the laser collimating lens 15 the light beam is converging slightly. In the present embodiment, the laser collimating lens 15 is a component AC080-016-A from Thorlabs®, but another collimating lens may be used.

The path between the first fold mirror 14 and the laser collimating lens 15 is enclosed by a baffle, which is not shown in FIG. 2. The baffle may be 3D printed to conform to the shape of the components and the light path.

After passing through the laser collimating lens 15, the collimated light is incident upon a polarising beam splitter 16. The polarising beam splitter 16 is configured to reflect light with a vertical polarisation (out of the paper as shown) and pass light with a horizontal polarisation (in the plane of the paper as shown). The polarising beam splitter 16 is a component PBS101 from Thorlabs®, but another polarising beam splitter could be used.

As mentioned previously, the light is emitted from the laser diode 11 with a vertical polarisation. Accordingly, the polarising beam splitter 16 is configured so that nearly all the light is reflected from the polarising beam splitter 16 towards to the spatial light modulator 12.

It can be seen from FIG. 2, that the light from the laser diode 11 takes a first c-shaped path to the spatial light modulator 12. In particular, the three sides of the c are formed by light passing i) from the laser diode 11 to the first fold mirror 14, ii) from the first fold mirror 14 to the polarising beam splitter 16, and iii) from the polarising beam splitter 16 to the spatial light modulator 12.

Looking more carefully at FIG. 2, the laser collimating lens 15 is provided at a slight angle to the optical axis of the polarising beam splitter 16. This slight angle is the width of the replay field divided by two and is calculated as follows:

$$\theta = \frac{\lambda_{min}}{2\delta}$$

where $\lambda_{min}$ is a shortest wavelength in the light beam, $\delta$ is the pixel pitch of the spatial light modulator 12, and $\theta$ is the angle at which the axis of the laser collimating lens 15 is off-axis from the optical axis of the polarising beam splitter 16. A typical value for 9 might be in the region of 3 to 6 degrees. In the first embodiment, the shortest wavelength is 450 nm, the pixel pitch is 3 µm, and the angle $\theta$ is 4.3 degrees.

The reason for this off-axis alignment of the laser collimating lens 15 is to cause the centre of the collimated light to be illuminated onto the spatial light modulator 12 off-axis. This means that the centre of the light hits the spatial light modulator 12 in the centre of the spatial light modulator 12 but at an angle to the normal axis of the spatial light modulator 12. The spatial light modulator 12 is illuminated off-axis due to the tilt of the laser collimating lens 15, but is should be noted that all optics subsequent to the spatial light modulator 12 are located on-axis. This is because aberrations caused by the light path up to the spatial light modulator 12 can be fully corrected in software, by adding a fixed phase mask to the image modulated at the spatial light modulator 12, whereas aberrations after the spatial light modulator 12 are difficult to correct.

A polariser 17 is provided between the polarising beam splitter 16 and the spatial light modulator 12. The polariser 17 is a plane polariser and is arranged with a plane of polarisation at 45 degrees between the horizontal and vertical planes of polarisation. Consequently, when light passes through the polariser 17 from the polarising beam splitter 16 to the spatial light modulator 12, around 50% of the vertically polarised light is transmitted to the spatial light modulator 12. Light is reflected from the spatial light modulator 12 without a change in polarisation direction, such that substantially all the light from the spatial light modulator 12 arrives at the polarising beam splitter 16 with a polarisation direction at 45 degrees to the vertical and horizontal polarisations. Accordingly, little light is lost at the polariser 17 as the light returns from the spatial light modulator 12. The polarising beam splitter 16 passes around half of the reflected light from the spatial light modulator 12. The other half is reflected back towards the laser collimating lens 15, the first fold mirror 14 and the laser diode 4 where it is absorbed with minimal interference to emitted light.

The above configuration is optimal when using the Compound Photonics® DP1080p26 spatial light modulator mentioned above, because the spatial light modulator works well with incident light that has a 45-degree polarisation. However, other examples of spatial light modulator may work optimally with a different polarisation of light. In such cases, a birefringent element can be added between the polariser 17 and the spatial light modulator 12 to rotate the polarisation of the light to a preferred angle. Other configurations are also possible, including using a non-polarising beam splitter.

The polariser 17 is tilted at a slight angle to the optical axis of the polarising beam splitter 16. In the present embodiment the polariser 17 is tilted by 1 degree to the optical axis. However, using the manufacturing tolerance of installation of the polariser 17 may also provide a satisfactory result. The reason for the tilt is to ensure that any direct reflections from the surfaces of the polariser 17 are sent to the opposite side of the zero-order light from the light of the replay image.

At the spatial light modulator 12 the incident light is reflected from the micro-display which controls its phase to create a replay image. However, due to imperfections in the spatial light modulator 12 and non-addressable areas between pixels, diffraction causes a zero-order light beam to form. The zero-order beam may be quite bright and is undesirable to display to a user. As the incident light beam on the spatial light modulator 12 is off-axis, the zero-order beam also forms off-axis.

The light from the spatial light modulator 12 which is passed by the polarising beam splitter 16 reaches a reflector in the form of a second fold mirror 18 located opposite the spatial light modulator 12 on an opposite side of the optical engine 1. As with the first fold mirror, the second fold mirror 18 is a metallic plano mirror. The light is reflected by the second fold mirror 18 towards a focusing system in the form of an objective lens 19. The objective lens 19 serves to focus the modulated light into different focal planes to form a real intermediate image 121. The objective lens 19 is a component AC080-020-A from Thorlabs (RTM), but other optical components may be used.

A light remover in the form of a field-stop aperture 120 is provided after the objective lens 19 to remove the zero-order light as will now be explained in more detail. The zero-order light from the spatial light modulator 12 focussed by the objective lens 19 has passed through the polarising beam splitter 16 and was reflected by the second fold mirror 18 to arrive at the field-stop aperture 120. Further, as explained earlier in connection with the laser collimating lens 15, the light from the laser collimating lens 15 is slightly converging when it hits the spatial light modulator 12 off-axis due to the off-axis arrangement of the laser collimating lens 15. Consequently, the zero-order light is off-axis, slightly converging and is focussed by the objective lens 19 so that it can be removed by the field-stop aperture 120. The zero-order light is focussed on or close to a solid portion of the field-stop aperture 120. The modulated light from the spatial light modulator 12 is focussed by the objective lens 19 and passes through the aperture of the field stop aperture 120 to form a replay image after the field-stop aperture 120. The infinity plane of focus (parallel light) of the replay image will be focussed by the objective lens 19 after the field-stop aperture 120 because, as just noted, the zero-order light was already slightly converging at the spatial light modulator 12 and so will focus earlier.

Any direct reflected light from the polariser 17, mentioned above, will also be cut out by the field-stop aperture 120 as it was located to the opposite side of the zero-order light compared to the light of the replay image.

The removal of zero-order light just described in connection with FIG. 2 can be further understood with reference to FIGS. 3a and 3b. FIGS. 3a and 3b illustrate a difference between using an on-axis parallel light beam to illuminate a spatial light modulator and using an off-axis converging light beam. FIG. 3a shows a parallel light beam that illuminates a polarising beam splitter 31 on the optical axis of the polarising beam splitter 31. The light beam is reflected by the polarising beam splitter 31 towards a spatial light modulator 32. The spatial light modulator is illuminated on-axis and modulates the incident parallel light. For reasons explained earlier, both a replay image and a zero-order light beam from the spatial light modulator 32 are directed towards a user's eye 33. As the light incident on the spatial light modulator 32 is on-axis, the brightest light hits the centre of the spatial light modulator 32 and the zero-order light beam is generated on the optical axis of the spatial light modulator 32. An objective lens 34 arranged on the optical axis of the spatial light modulator 32 focusses the light from the spatial light modulator 32 after it has been transmitted by the polarising beam splitter 31. Although not shown or described in detail, the apparatus shown in FIG. 3a includes a polariser between the polarising beam splitter 31 and the spatial light modulator 32 to allow light reflected from the spatial light modulator 31 to be transmitted by the polarising beam splitter 31.

As shown in FIG. 3a, the zero-order light focusses in the same plane 35 as light that emerged parallel (focus at infinity) from the spatial light modulator 32.

When trying to remove the zero-order light, the spatial light modulator 32 might be tilted in order to try to displace the replay image laterally from the zero-order light. This is illustrated in FIG. 3a with a central point of the replay image 37 (focus at infinity) being shown displaced from a focal point 38 of the zero-order light. A field-stop aperture may be provided in the apparatus shown in FIG. 3a to cut out the zero-order light. However, as the zero-order light is cut out in the same plane of focus as the parallel light from the replay image, the edge of the field of view will have a harsh appearance. The apparatus shown in FIG. 3a does not embody the invention.

FIG. 3b shows the same apparatus to FIG. 3a, but instead the polarising beam splitter 31 in this embodiment is illuminated by a beam of converging off-axis light 39. The spatial light modulator 32 is illuminated off-axis by the incident light from the polarising beam splitter 31. The spatial light modulator 32 modulates the incident light to generate a replay image and a zero-order light beam is also formed. The replay image is emitted from the spatial light modulator 32 on-axis and a focal point 40 of the central point of the replay image with focus at infinity (parallel light from the spatial light modulator 32) is formed after the objective lens 34. The zero-order light is formed from the converging light and accordingly focusses earlier than the previously described focal point 40 of the replay image. Additionally, because the spatial light modulator 32 is illuminated off-axis the focal point 41 of the zero-order light is also off-axis. The zero-order light can therefore be relatively easily be removed. Additionally, because the zero-order light is removed in a plane of focus other than the plane of focus of the parallel light from the spatial light modulator 32, the appearance of the edge of the field of view is less harsh for the viewer.

Returning to the embodiment shown in FIG. 2, the field-stop aperture 120 may, optionally, have a light sensor positioned on it or nearby to positively account for the zero-order light hitting the field-stop aperture 120. In such embodiments, the detection of light from the sensor may be used to logically control the power to the laser diode 11. In particular, if power is supplied to the laser diode 11 (i.e. the laser diode is outputting a laser beam) then if no light is detected by the sensor, a control unit (not shown) may cut power to the laser diode 11 because the zero-order light cannot be accounted for. This prevents the zero-order light being inadvertently passed on to the user due to misconfiguration of the optical engine 1.

The spatial light modulator 12 may be tilt-ably mounted to allow control of positioning of the zero-order light on the field-stop aperture 120. Control of the angle of tilt of the spatial light modulator 12 may be by a tilt-able mounting of a type known in the art. Alternatively, the spatial light modulator 12 may be adjusted (for example, shimmed) during manufacture to adjust its orientation.

The real intermediate image 121 is formed in various focal planes beyond the field-stop aperture 120 and is a 3-D holographic replay image. By removing the zero-order light in a plane before the planes of focus of the replay image, a harsh edge to the field of view, caused by the field-stop aperture 120 can be avoided. Further, because the zero-order light focusses before the region where the intermediate image is formed, the zero-order light is diverging in the intermediate image and the user cannot focus on it. This is also an advantageous safety feature.

The light from the objective lens 19, from which the zero-order light has now been removed is reflected by a reflector in the form of a third fold mirror 122, again a metallic plano mirror, before entering a Plossl optical component in the form of a Plossl optical element 123. The Plossl optical element is of a known type and produces a de-magnified image ready to be output by the output fold mirror 13. The Plossl optical element is sometimes referred to as a 'Plossl eyepiece' and comprises two symmetric optical elements. In the present embodiment, the two symmetric optical elements are components AC064-013-A from Thorlabs®, but other optical components could be used. Advantages of this optical element are that it comprises relatively few optical elements, has a good field of view and provides good image quality. The focal distance of a Plossl eyepiece is typically quite short, which helps with keeping the optical engine 1 compact.

A second aperture 124 is provided after the Plossl optical element 123. At this stage, it is also appropriate to discuss an additional function of the second fold mirror 18. The second fold mirror 18 is provided in a recess, which effectively provides an aperture. The second aperture 124 and recess of the second fold mirror 18 both remove stray off-axis light and improve the appearance of the replay image for the user.

A reduced (de-magnified) image of the spatial light modulator 12 is formed by the Plossl optical element in a region 125 after the Plossl optical element 123 and before the light is reflected by the output fold mirror 13 towards the optical combiner 2. In the first embodiment the replay image formed in the region 125 has a size approximately one third of the size of the replay image generated by the spatial light modulator 12.

The optical combiner 2 can be one of several known optical combiners for an augmented reality headset. For example, the optical combiner 2 could use a semi-transparent mirror or beam splitter to combine the replay image from the optical engine 1 with light entering the headset from outside. The optical combiner 2 may be a 'birdbath' combiner of a type known in the art including planar and spherical elements.

It can be seen from FIG. 2, that the light takes a second c-shaped path from the spatial light modulator 12 to the output fold mirror 13. In particular, the three sides of the c are formed by light passing i) from the spatial light modulator 12 to the second fold mirror 18, ii) from the second fold mirror 18 to the third fold mirror 122, and iii) passing from the third fold mirror 122 to the output fold mirror 13. The first c-shaped path, described earlier, is nested within the second c-shaped path.

In the first embodiment the terminal optical element is an output fold mirror 13. However, in other embodiments, the output fold mirror 13 may be replaced by a steerable field-of-view scanning mirror to allow adjustment of the field of view or a micro-scale vibrator to smooth out speckle noise caused by use of the laser diode 11.

The optical engine 1 is capable of good optical performance and may, in some cases, produce a near diffraction-limited image to be re-imaged for the user via the optical combiner 2.

FIG. 4 shows a holographic augmented-reality headset 40 according to an embodiment of the invention. The holographic augmented-reality headset 40 comprises a main housing 41, a pair of arms 42 and a pair of optical combiners 43. The main housing contains a pair of optical engines (not shown), of a type described in the first embodiment. A first of the optical engines generates a holographic image for display in the right eye of a user and a second of the optical engines generates a holographic image for display in the left eye of a user. The optical combiners 43 are transparent screens and are configured to deliver the holographic replay images to the user. In use, the user can look through the optical combiners 43 to view the holographic replay images generated by the optical engines.

The above embodiments are to be understood as illustrative examples of the invention. Further embodiments of the invention are envisaged. For example, although not shown in the figures, the optical engine 1 may further include a monitor photodiode to measure light intensity (brightness) from the laser diode 11. The monitor photodiode may be provided close to the laser diode 11 or further down the optical path. The laser photodiode is provided to measure light intensity. The measured level of light is then used to control power to the laser diode 11 thereby allowing closed-loop control of laser power to ensure uniform laser brightness. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A holographic display comprising an optical assembly, the optical assembly comprising:
   a light source;
   a light-modulation element arranged to be illuminated off-axis by a light beam and configured to modulate the incident light, the light-modulation element comprising an array of pixels and being arranged to generate a replay image and a zero-order light beam;
   a focusing system arranged after the light-modulation element and configured to focus modulated light from the light-modulation element and the zero-order light beam;
   a light remover positioned after the focusing system configured to remove the zero-order light beam from the light focused by the focusing system;
   a terminal optical element for directing modulated light from which the zero-order light has been removed by the light remover from the optical assembly;
   a collimator illuminated by a light beam from the light source to cause the light beam to converge; and
   a beam splitter configured to receive light from the collimator and reflect the received light onto the light-modulation element;
   wherein:
      an optical axis of the collimator is out of alignment with an optical axis of the beam splitter;
      the optical axis of the collimator is arranged at an angle with respect to the optical axis of the beam splitter such that a centre of the beam of light from the collimator hits the light-modulation element off-axis and in the centre of the light-modulation element;
      the angle is substantially equal to the value of the shortest wavelength of light in the light beam divided by twice the value of a pixel pitch of the array of pixels;
      all optical elements located after the light-modulation element, including the focusing system, are centred on a centre of the field of view of the replay image;
      the focusing system is configured to focus the zero-order light from the light-modulation element in a first plane different from a second plane which is the plane of focus of parallel light of the replay image, and
      the light remover is configured to remove the zero-order light in the first plane.

2. A holographic display according to claim 1, wherein the focusing system is configured to form an intermediate replay image beyond the light remover located in the first plane.

3. A holographic display according to claim 1, wherein the optical assembly further comprises a polariser arranged between the beam splitter and the light-modulation element.

4. A holographic display according to claim 3, wherein the polariser is tilted with respect to the optical axis of the light-modulation element so that any direct reflections are not a direct reflection of the zero-order light.

5. A holographic display according to claim 4, wherein the polariser is arranged to permit transmission of light having a polarisation set at 45 degrees to the polarisation plane of the beam splitter.

6. A holographic display according to claim 3, wherein the polariser is arranged to permit transmission of light having a polarisation set at 45 degrees to the polarisation plane of the beam splitter.

7. A holographic display according to claim 1, wherein the optical assembly further comprises a mirror positioned after the light modulation element, wherein the mirror is located within a recess or aperture to inhibit reflection of peripheral light.

8. A holographic display according to claim 1, wherein the light remover is a field-stop aperture.

9. A holographic display according to claim 8, wherein the light-modulation element comprises an adjuster to allow the light-modulation element to be tilted about at least one axis thereby allowing the zero-order light to be directed onto the field-stop aperture.

10. A holographic display according to claim 9, wherein the optical assembly further comprises a sensor to detect whether or not zero-order light is being cut out by the field-stop aperture.

11. A holographic display according to claim 10, wherein the optical assembly is configured to stop light emission by the light source in a case that light is being emitted by the light source and light is not detected by the sensor.

12. A holographic display according to claim 8, wherein the optical assembly further comprises a sensor to detect whether or not zero-order light is being cut out by the field-stop aperture.

13. A holographic display according to claim 12, wherein the optical assembly is configured to stop light emission by the light source in a case that light is being emitted by the light source and light is not detected by the sensor.

14. A holographic display according to claim 1, wherein the focusing system is an objective lens.

15. A holographic display according to claim 1, wherein the optical assembly further comprises a Plossl optical component located after the light remover wherein the Plossl optical component comprises a pair of symmetric optical elements and is configured to generate a reduced image to be output from the optical assembly.

16. A holographic display according to claim 15, wherein the optical assembly further comprises a second aperture provided after the Plossl optical component to remove stray light.

17. An optical assembly, comprising:
   a light source;
   a light-modulation element arranged to be illuminated off-axis by a light beam and configured to modulate the incident light, the light-modulation element comprising an array of pixels and being arranged to generate a replay image and a zero-order light beam;
   a focusing system arranged after the light-modulation element and configured to focus modulated light from the light-modulation element and the zero-order light beam;
   a light remover positioned after the focusing system configured to remove the zero-order light beam from the light focused by the focusing system;
   a terminal optical element for directing modulated light from which the zero-order light has been removed by the light remover from the optical assembly;
   a collimator illuminated by a light beam from the light source to cause the light beam to converge; and
   a beam splitter configured to receive light from the collimator and reflect the received light onto the light-modulation element;
   wherein:
      an optical axis of the collimator is out of alignment with an optical axis of the beam splitter;
      the optical axis of the collimator is arranged at an angle with respect to the optical axis of the beam splitter such that a centre of the beam of light from the collimator hits the light-modulation element off-axis and in the centre of the light-modulation element;

the angle is substantially equal to the value of the shortest wavelength of light in the light beam divided by twice the value of a pixel pitch of the array of pixels;

all optical elements located after the light-modulation element, including the focusing system, are centred on a centre of the field of view of the replay image;

the focusing system is configured to focus the zero-order light from the light-modulation element in a first plane different from a second plane which is the plane of focus of parallel light of the replay image, and the light remover is configured to remove the zero-order light in the first plane.

18. An optical assembly according to claim 17, wherein the optical assembly further comprises a polariser arranged between the beam splitter and the light-modulation element.

19. An optical assembly according to claim 18, wherein the polariser is tilted with respect to the optical axis of the light-modulation element so that any direct reflections are not a direct reflection of the zero-order light.

20. An optical assembly according to claim 17, wherein the optical assembly further comprises a mirror positioned after the light modulation element, wherein the mirror is located within a recess or aperture to inhibit reflection of peripheral light.

* * * * *